Patented Mar. 30, 1937

2,075,205

UNITED STATES PATENT OFFICE 2,075,205

PURIFICATION OF ALCOHOLS

Alfred E. Jurist and Louis W. Green, Brooklyn, N. Y., assignors to E. R. Squibb & Sons, New York, N. Y., a corporation of New York No Drawing. Application February 27, 1935, Serial No. 8,569

13 Claims. (Cl. 260—156)

This invention relates to the purification of alcohols and has for its object the provision of a method whereby alcohols may be freed from organic impurities, particularly aldehydes, efficiently and economically.

In the practice of this invention, alcohols to be purified are contacted with the nitrate of an easily reducible metal—that is, nitrates the cation of which is polyvalent and can easily be reduced to a lower valence, or is monovalent and can easily be reduced to the metallic state—, especially a compound selected from the group consisting of cupric, ferric, and silver nitrates—as by introducing the nitrate into the alcohol, or by passing the vapor of the alcohol through a hydroalcoholic solution of the nitrate. Acid formed by the interaction of the nitrate and the organic impurities may be removed from the alcohol by alkalinization.

Example 1

Ethyl alcohol (containing organic impurities) is distilled through a scrubber containing a 600 cc. solution of 210 g. of cupric nitrate in ethyl alcohol, maintained at a temperature such that the vapor is not condensed, thorough contact of the alcohol vapor with the scrubber solution being insured by interposing particles of inert nonabsorbent material in the way of the vapor, forcing it to follow a circuitous path through the solution. After leaving the scrubber, the vapor may be (a) passed through an alkali scrubber and condensed, or (b) condensed, alkalinized, and distilled. (The alkalinization of the ethyl alcohol is effected in the absence of the cupric nitrate, to prevent formation of acetylaldehyde.) Ethyl alcohol so treated gives a negative result for organic impurities by the U. S. P. X test, and meets the U. S. P. X specifications with respect to acidity.

Example 2

500 cc. of ethyl alcohol (containing organic impurities) is refluxed for several hours with 10 g. of cupric or ferric or silver nitrate, and the alcohol is distilled to separate it from the salt. To remove acid therefrom, the distillate is made alkaline with a suitable alkali, such as sodium or calcium hydroxide. When distilled again, the ethyl alcohol reacts negatively to the U. S. P. X test for organic impurities.

Among the various other volatile alcohols to which the invention may be applied are methyl alcohol, isopropyl alcohol, and tertiarybutyl alcohol.

It is to be understood that the foregoing embodiments are merely illustrative and by no means limitative of the invention, which may assume various other forms—as with respect to the nitrates employed, the alcohols treated, and the procedures followed—within the scope of the appended claims.

We claim:

1. In the purification of alcohols, the step that comprises contacting them with the nitrate of an easily reducible metal, such contact being effected in the absence of alkali.

2. In the purification of alcohols, the step that comprises contacting them with a compound selected from the group consisting of cupric, ferric, and silver nitrates, such contact being effected in the absence of alkali.

3. In the purification of alcohols, the step that comprises contacting them with cupric nitrate.

4. In the purification of alcohols, the step that comprises passing their vapors through a solution of a nitrate of an easily reducible metal.

5. In the purification of alcohols, the steps of contacting them with the nitrate of an easily reducible metal, distilling, and alkalinizing.

6. In the purification of ethyl alcohol, the step that comprises contacting it with the nitrate of an easily reducible metal, such contact being effected in the absence of alkali.

7. In the purification of ethyl alcohol, the step that comprises passing its vapor through a solution of the nitrate of an easily reducible metal.

8. In the purification of ethyl alcohol, the step that comprises contacting it with a compound selected from the group consisting of cupric, ferric, and silver nitrates, such contact being effected in the absence of alkali.

9. In the purification of ethyl alcohol, the step that comprises contacting it with cupric nitrate.

10. In the purification of ethyl alcohol, the step that comprises passing its vapor through a solution of cupric nitrate.

11. In the purification of ethyl alcohol, the steps of passing its vapor through a hydroalcoholic solution of cupric nitrate and alkalinizing.

12. In the purification of alcohols, the step that comprises contacting them with the nitrate of an easily reducible polyvalent metal.

13. In the purification of ethyl alcohol, the step that comprises contacting it with the nitrate of an easily reducible polyvalent metal.

ALFRED E. JURIST.
LOUIS W. GREEN.